United States Patent
Bennett et al.

(10) Patent No.: US 12,019,785 B2
(45) Date of Patent: Jun. 25, 2024

(54) SYSTEMS, METHODS, AND DEVICES FOR OBFUSCATION OF BROWSER FINGERPRINT DATA ON THE WORLD WIDE WEB

(71) Applicant: JPMORGAN CHASE BANK, N.A., New York, NY (US)

(72) Inventors: Jeremy F. Bennett, San Carlos, CA (US); Rod Bachelor, San Carlos, CA (US); Andrew Grignon, Half Moon Bay, CA (US); Howard Spector, Woolwich, NJ (US); Ralph Darmo, West Chester, PA (US); Christopher Choi, Ridgewood, NJ (US); Jeffrey E Miller, Media, PA (US); Hallie Huggins, Huntington Station, NY (US); Tuan Dao, Richardson, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 300 days.

(21) Appl. No.: 17/652,912

(22) Filed: Feb. 28, 2022

(65) Prior Publication Data

US 2022/0188458 A1 Jun. 16, 2022

Related U.S. Application Data

(63) Continuation of application No. 16/598,734, filed on Oct. 10, 2019, now Pat. No. 11,288,398.
(Continued)

(51) Int. Cl.
*G06F 21/62* (2013.01)
*G06F 16/955* (2019.01)
(Continued)

(52) U.S. Cl.
CPC ........ *G06F 21/6263* (2013.01); *G06F 16/955* (2019.01); *G06F 21/602* (2013.01);
(Continued)

(58) Field of Classification Search
CPC ..... G06F 21/6254; H04W 12/02; H04L 67/02
See application file for complete search history.

(56) References Cited

U.S. PATENT DOCUMENTS

| | | | |
|---|---|---|---|
| 9,060,031 B1 | 6/2015 | Taylor et al. | |
| 10,621,365 B1 * | 4/2020 | Powers | H04L 9/0894 |

(Continued)

FOREIGN PATENT DOCUMENTS

| | | |
|---|---|---|
| CA | 2775427 | 10/2012 |
| DE | 102017116425 | 1/2018 |

OTHER PUBLICATIONS

History Search (Year: 2024).*
(Continued)

*Primary Examiner* — Samson B Lemma
*Assistant Examiner* — Richard W Cruz-Franqui
(74) *Attorney, Agent, or Firm* — GREENBERG TRAURIG LLP

(57) ABSTRACT

Systems, methods, and devices for obfuscation of browser fingerprint data are disclosed. In one embodiment, in an information processing apparatus comprising at least one computer processor, a method may include: (1) receiving an electronic communication from an electronic device to a destination; (2) identifying a raw device fingerprint value in the electronic communication from an electronic device; (3) selecting at least one replacement value for the raw device fingerprint value; (4) replacing the raw device fingerprint value with the replacement value in the electronic communication; and (5) sending the electronic communication with the replacement value to the destination.

20 Claims, 5 Drawing Sheets

Related U.S. Application Data

(60) Provisional application No. 62/874,240, filed on Jul. 15, 2019, provisional application No. 62/856,491, filed on Jun. 3, 2019.

(51) Int. Cl.
| | |
|---|---|
| *G06F 21/60* | (2013.01) |
| *G06F 40/279* | (2020.01) |
| *G06N 20/00* | (2019.01) |
| *H04L 9/32* | (2006.01) |
| *H04L 9/40* | (2022.01) |
| *H04W 12/02* | (2009.01) |
| *G01S 19/42* | (2010.01) |
| *H04L 61/5007* | (2022.01) |
| *H04L 67/02* | (2022.01) |

(52) U.S. Cl.
CPC ........ *G06F 21/6254* (2013.01); *G06F 40/279* (2020.01); *G06N 20/00* (2019.01); *H04L 9/3213* (2013.01); *H04L 63/1425* (2013.01); *H04L 63/20* (2013.01); *H04W 12/02* (2013.01); *G01S 19/42* (2013.01); *G06F 2221/2149* (2013.01); *H04L 61/5007* (2022.05); *H04L 67/02* (2013.01)

(56) References Cited

U.S. PATENT DOCUMENTS

| | | | | |
|---|---|---|---|---|
| 11,281,803 | B2* | 3/2022 | Chen | G06F 21/6254 |
| 2010/0042583 | A1* | 2/2010 | Gervais | G06Q 40/08 |
| | | | | 707/E17.014 |
| 2012/0185947 | A1* | 7/2012 | Phillips | H04L 67/04 |
| | | | | 726/26 |
| 2012/0240237 | A1* | 9/2012 | Kanevsky | G06F 16/957 |
| | | | | 726/26 |
| 2013/0212465 | A1* | 8/2013 | Kovatch | G06F 40/143 |
| | | | | 715/234 |
| 2014/0129670 | A1* | 5/2014 | Oliver | G06F 21/10 |
| | | | | 709/217 |
| 2015/0350890 | A1* | 12/2015 | Arunkumar | H04W 12/02 |
| | | | | 455/411 |
| 2016/0164915 | A1* | 6/2016 | Cook | H04L 63/1483 |
| | | | | 726/1 |
| 2016/0321468 | A1* | 11/2016 | Stankiewicz | G06F 21/6254 |
| 2017/0193624 | A1* | 7/2017 | Tsai | G06Q 50/01 |
| 2017/0357826 | A1* | 12/2017 | Gouget | G06F 21/6254 |
| 2017/0357827 | A1* | 12/2017 | Shoa | H04L 63/08 |
| 2018/0083843 | A1* | 3/2018 | Sambandam | H04L 41/5032 |
| 2018/0211062 | A1* | 7/2018 | Holland | G06F 21/6254 |
| 2018/0322306 | A1* | 11/2018 | Obembe | G06F 21/6254 |
| 2019/0354716 | A1* | 11/2019 | Basava | G06F 16/2379 |
| 2019/0377901 | A1* | 12/2019 | Balzer | G06F 21/6254 |
| 2020/0356260 | A1* | 11/2020 | Cutler | G06F 3/0482 |
| 2020/0380166 | A1* | 12/2020 | Kane | G06F 21/6245 |
| 2021/0182439 | A1* | 6/2021 | Singh | G06F 21/629 |
| 2023/0403562 | A1* | 12/2023 | Spector | H04L 67/02 |

OTHER PUBLICATIONS

International Search Report, dated Sep. 16, 2020, from corresponding International Application No. PCT/US2020/035024.
Written Opinion of the International Searching Authority, dated Sep. 16, 2020, from corresponding International Application No. PCT/US2020/035024.
International Search Report, dated Sep. 10, 2020, from corresponding International Application No. PCT/US2020/035777.
Written Opinion of the International Searching Authority, dated Sep. 10, 2020, from corresponding International Application No. PCT/US2020/035777.
International Search Report, dated Sep. 14, 2020, from corresponding International Application No. PCT/US2020/035393.
Written Opinion of the International Searching Authority, dated Sep. 14, 2020, from corresponding International Application No. PCT/US2020/035393.
Nikiforakis, Nick; et al., PriVaricator: Deceiving Fingerprinters with Little White Lies, MSR-TR-2014-26, Feb. 28, 2014.
Faizkhademi, Amin; et al., FPGuard: Detection and Prevention of Browser Fingerprinting, School of Computing, Queen's University, Kingston, Canada, Jul. 2015.
Panopticlick, Panopticlick 3.0, Is your browser safe against tracking?, EFF: Electronic Frontier Foundation, Mar. 4, 2016.
Szymielewicz et al., The GDPR and Browser Fingerprinting: How It Changes the Game for the Sneakiest Web Trackers, EFF: Electronic Frontier Foundation, Jun. 19, 2108.
Multilogin, The Only Two Approaches to Combat Browser Fingerprinting, Multilogin.com, Blog, May 9, 2017.
Stockley, Browser fingerprints—the invisible cookies you can't delete, Naked Security, Sophos.com, Dec. 1, 2014.

\* cited by examiner

SYSTEMS, METHODS, AND DEVICES FOR OBFUSCATION OF BROWSER FINGERPRINT DATA ON THE WORLD WIDE WEB

RELATED APPLICATIONS

This application is a continuation of U.S. patent application Ser. No. 16/598,734, filed Oct. 10, 2019, now U.S. Pat. No. 11,288,398, which claims the benefit of U.S. Provisional Patent Application Ser. No. 62/856,491, filed Jun. 3, 2019, and U.S. Provisional Patent Application Ser. No. 62/874,240, filed Jul. 15, 2019, the disclosures of each of which is hereby incorporated, by reference, in its entirety.

BACKGROUND OF THE INVENTION

1. Field of the Invention

Embodiments are generally directed to managing privacy and digital identity data, and, in particular, systems, methods, and devices for obfuscation of browser fingerprint data on the world wide web.

2. Description of the Related Art

Every person has a right to privacy and a digital identity that they own and control but we lack a trusted, simple way to preserve privacy. Everything we say, do and experience on our phones and online is tracked and controlled by other parties, and consumers are often unaware what data are being collected and shared about them.

Consumers are growing increasingly concerned about privacy and security but do not act to protect themselves because they may not know what data are exposed or the implications of the exposure. They often choose convenience over privacy. For example, terms and conditions that a consumer must accept before using an app, a web service, etc. are lengthy and confusing. Consumers are thus unaware of what aspects of data and privacy they are sacrificing in exchange for using the app or service.

SUMMARY OF THE INVENTION

Systems, methods, and devices for obfuscation of browser fingerprint data are disclosed. In one embodiment, in an information processing apparatus comprising at least one computer processor. a method for obfuscation of browser fingerprint data may include: (1) receiving an electronic communication from an electronic device to a destination; (2) identifying a raw device fingerprint value in the electronic communication from an electronic device; (3) selecting at least one replacement value for the raw device fingerprint value; (4) replacing the raw device fingerprint value with the replacement value in the electronic communication; and (5) sending the electronic communication with the replacement value to the destination.

In one embodiment, the electronic communication may be from a browser executed by the electronic device, a computer application executed by the electronic device, etc.

In one embodiment, the destination may be a website provider or an application provider.

In one embodiment, the raw device fingerprint value may be a browser identifier, a flash status, a cookie status, a display characteristic, a font supported, a form field, a java status, a language status, a Silverlight status, an operating system identifier, an operating system version, a set time zone, a touchscreen status, a default browser identification, an identification of an enabled plugin, data stored in persistent browser storage. GPS coordinates for the electronic device, a geolocation of the electronic device, an IP address of the electronic device, etc.

In one embodiment, the raw device fingerprint value may be in a HTTP header fields sent as part of a GET command, a HTTP body data sent as part of a POST or PUT command, and a HTTP URL argument sent as part of a GET command.

In one embodiment, the replacement value changes a case of a character in the raw device fingerprint value, inserts or removes a white space in the raw device fingerprint value, eliminates a redundant value in the raw device fingerprint value, changes a version number in the raw device fingerprint value, inserts an unused data element in the raw device fingerprint value, etc.

In one embodiment, the replacement value for the device fingerprint value may be selected to not impact a user experience.

In one embodiment, a range of replacement values may be provided for each device fingerprint value. The replacement value may be a default value, a random or pseudo-random value, etc.

In one embodiment, the information processing apparatus is associated with a provider of cellular-based data services, Wi-Fi services, or Internet services.

According to another embodiment, a device for obfuscation of browser fingerprint data may include at least one computer processor; a memory; an input interface and an output interface. The input interface may be configured to receive an electronic communication from an electronic device to a destination. The at least one computer processor may be configured to identify a raw device fingerprint value in the electronic communication from an electronic device; to generate at least one replacement value for the raw device fingerprint value; and to replace the raw device fingerprint value with the replacement value in the electronic communication. The output interface may be configured to send the electronic communication with the replacement value to the destination.

In one embodiment, the device may be associated with a provider of cellular-based data services, Wi-Fi services, or Internet services.

In one embodiment, the electronic communication may be from a browser executed by the electronic device, or from a computer application executed by the electronic device.

In one embodiment, the destination may be a website provider or an application provider.

In one embodiment, the raw device fingerprint value may be a browser identifier, a flash status, a cookie status, a display characteristic, a font supported, a form field, a java status, a language status, a Silverlight status, an operating system identifier, an operating system version, a set time zone, a touchscreen status, a default browser identification, an identification of an enabled plugin, data stored in persistent browser storage. GPS coordinates for the electronic device, a geolocation of the electronic device, an IP address of the electronic device, etc.

In one embodiment, the raw device fingerprint value may be in a HTTP header fields sent as part of a GET command, a HTTP body data sent as part of a POST or PUT command, and a HTTP URL argument sent as part of a GET command.

In one embodiment, the replacement value changes a case of a character in the raw device fingerprint value, inserts or removes a white space in the raw device fingerprint value, eliminates a redundant value in the raw device fingerprint value, changes a version number in the raw device fingerprint value, inserts an unused data element in the raw device fingerprint value, etc.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Embodiments are directed to systems, methods, and devices for obfuscation of browser fingerprint data.

Without their knowledge, consumers are tracked online by advertisers, service providers, and marketers using a technique that is often referred to as device or browser fingerprinting. This technique collects information shared by a user's browser intended to improve the browsing experience, for example, the browser name and version, the device screen size, which features are enabled, etc. Instead of using this data as to improve the user experience, app providers, website providers, advertisers, etc. may combine these values to create a unique, or mostly unique, fingerprint for that particular browser on that particular device. This fingerprint may be shared across networks and services to develop a highly accurate behavioral model for the owner of the device. If, at some point, the user also logs into a social network or other account that participates in the information sharing, then the behavioral model may be linked to a named account and may be expanded.

Because the browser data is not personally identifiable data, or even private data, the data collection may be done—and is often done—without user permission or awareness.

Embodiments are directed to features that may be associated with, used by, or used in conjunction with an in-line architecture. For example, the architecture may include a network proxy that may be provided, for example, between an electronic device that may provide identifying information (e.g., a smartphone, computer, Internet of Things (IoT) appliance, smart watch, etc.) and the Internet services (e.g., a website, an app backend, etc.) the device is accessing. The network proxy may be provided, for example, in a service provider, such as an Internet Service Provider (ISP), a mobile data provider (e.g., a cellular data provider), etc.

In another embodiment, some or all functionality may be provided in a network gateway. In another embodiment, some or all features may be implemented in a personal hotspot, a local micro-cell, in a consumer or local network device that may be connected into a network designed to insert itself into the communication flow (aka ARP or IP spoofing or "Man in the Middle"), etc. In another embodiment, some or all functionality may be provided on a computer program or "app" on the electronic device. And, in embodiments, combinations of any of the above may be used as is necessary and/or desired.

Embodiments may empower consumers to take control of their digital life by, for example, allowing data to be transmitted but in redacted or anonymized fashion.

Figure 1:
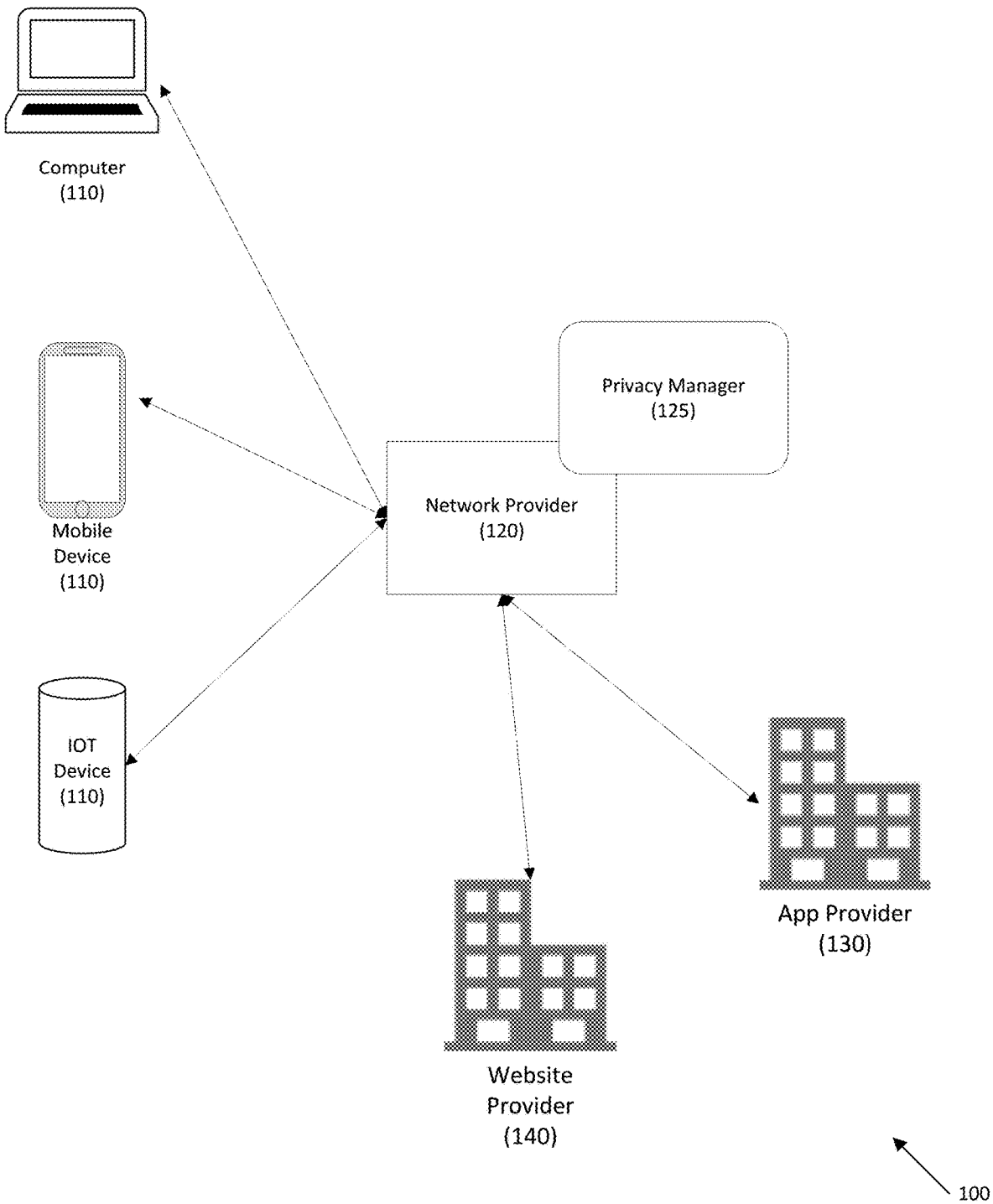
FIG. 1 discloses system for obfuscation of browser fingerprint data according to one embodiment.

Referring to FIG. 1, a system for obfuscation of browser fingerprint data is disclosed according to one embodiment. System 100 may include one or more consumer electronic devices 110, such as smart phones, computers (e.g., desktop, laptop, notebook, etc.), IoT devices (e.g., smart watches, smart rings, home automation devices, home voice-controlled devices, etc.), smart vehicles, smart fitness devices, etc. Any device that may share information with a third party may be included as is necessary and/or desired.

System 100 may further include network provider 120 that may provide data services for the electronic devices. In one embodiment, network provider may provide cellular-based data services, Wi-Fi services, Internet services, etc. Example network providers 100 include AT&T, Verizon, Sprint, T-Mobile, Comcast, etc.

System 100 may further include one or more app provider 130 and/or one or more website provider 140. App providers 130 or website providers 140 may provide software programs (e.g., apps, operating systems, websites, etc.) that may be installed on electronic devices 110 that may share data with app providers 130 or website providers 140. App providers 130 or website providers 140 may require the consumer to accept terms and conditions before the consumer may use the app or accessing the website.

Examples of apps and websites include electronic mail services, fitness or health tracking services, location-based services, news, social media, travel, games, financial, etc. Any type of app, website, etc. may be included as is necessary and/or desired.

Network provider 120 may execute privacy manager 125, which may be implemented as hardware and/or software. For example, privacy manager may be implemented on one or more physical servers, in the cloud, in both, etc.

Privacy manager 125 also be implemented as a service that may be activated or deactivated by the user of electronic devices 110.

Figure 2:
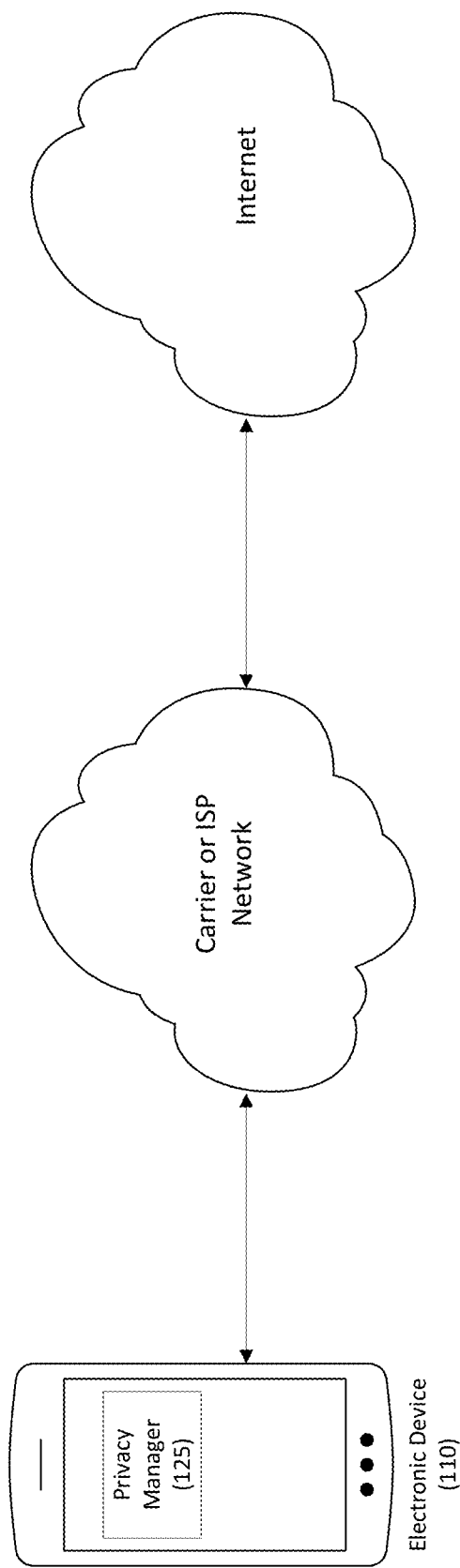
FIG. 2 discloses a system for obfuscation of browser fingerprint data in which a privacy service is implemented as a plugin in a consumer device according to one embodiment.
Figure 3:
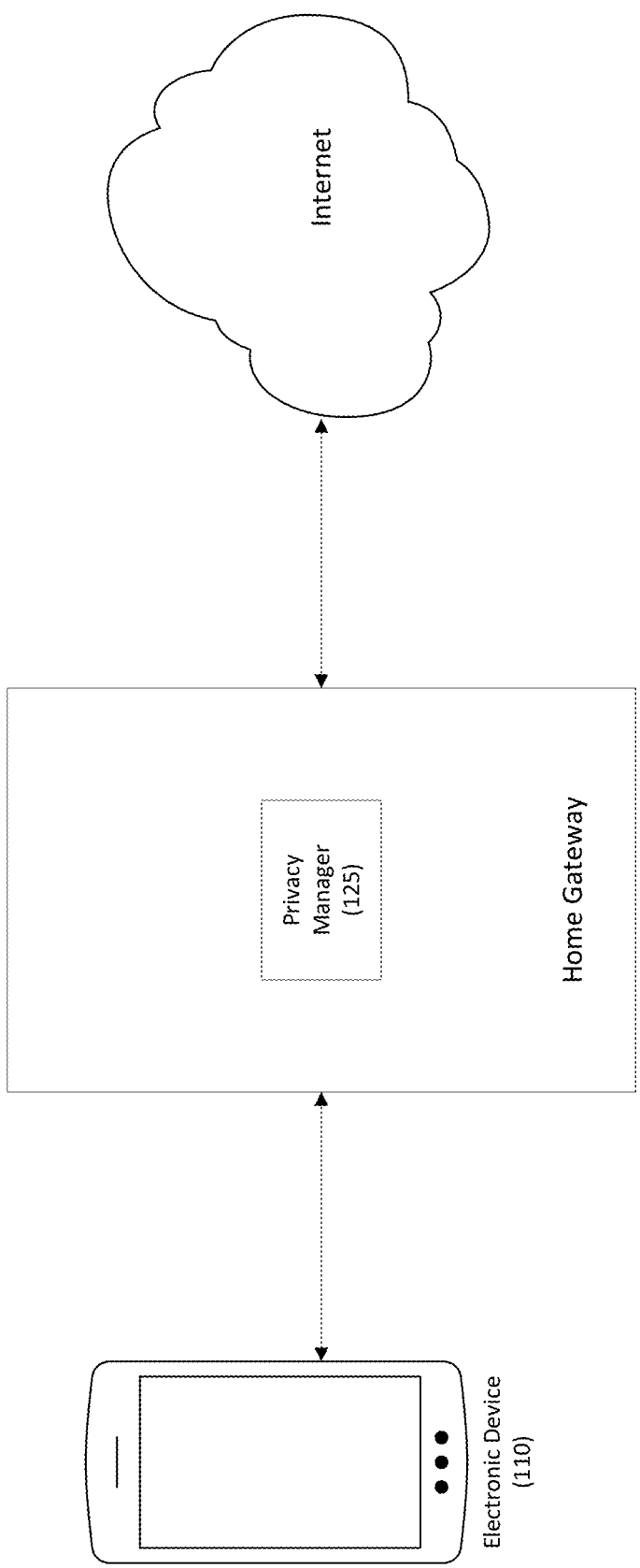
FIG. 3 depicts a system for obfuscation of browser fingerprint data in which privacy protection is implemented in a home gateway according to one embodiment.
Figure 4:
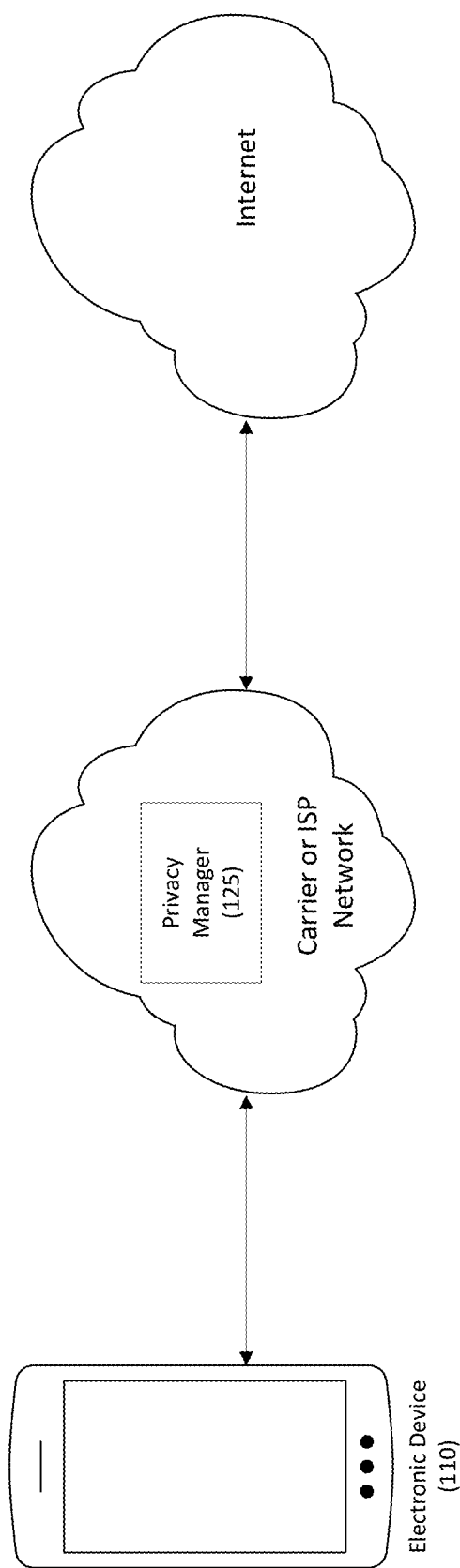
FIG. 4 depicts a system for obfuscation of browser fingerprint data in which a privacy appliance is implemented in a carrier or Internet Service Provider (ISP) network according to one embodiment.

In embodiments, privacy manager 125 may be implemented at one or more point within system 100. For example, FIG. 2 depicts privacy manager 125 implemented as a plugin in the consumer device. FIG. 3 depicts privacy manager 125 implemented in a home gateway. FIG. 4 depicts privacy manager 125 implemented as implemented in a carrier or Internet Service Provider (ISP) network. Other implementations, and combinations thereof, may be used as is necessary and/or desired.

In one embodiment, privacy manager 215 may implement privacy features, such as device or browser fingerprint obfuscation. For example, in embodiments, privacy manager 215 may first detect the values (e.g., browser and/or device characteristics) that may be used to generate the fingerprint in the places they may appear. Next, privacy manager 215 may alter at least some of these values in such a way as to force the generation of a different fingerprint while not disrupting the intended purpose of providing a better browsing experience. Then, privacy manager 215 may replace the old values with the new values may be replaced in the protocol stream before they are sent to the target web server, app, etc.

Figure 5:
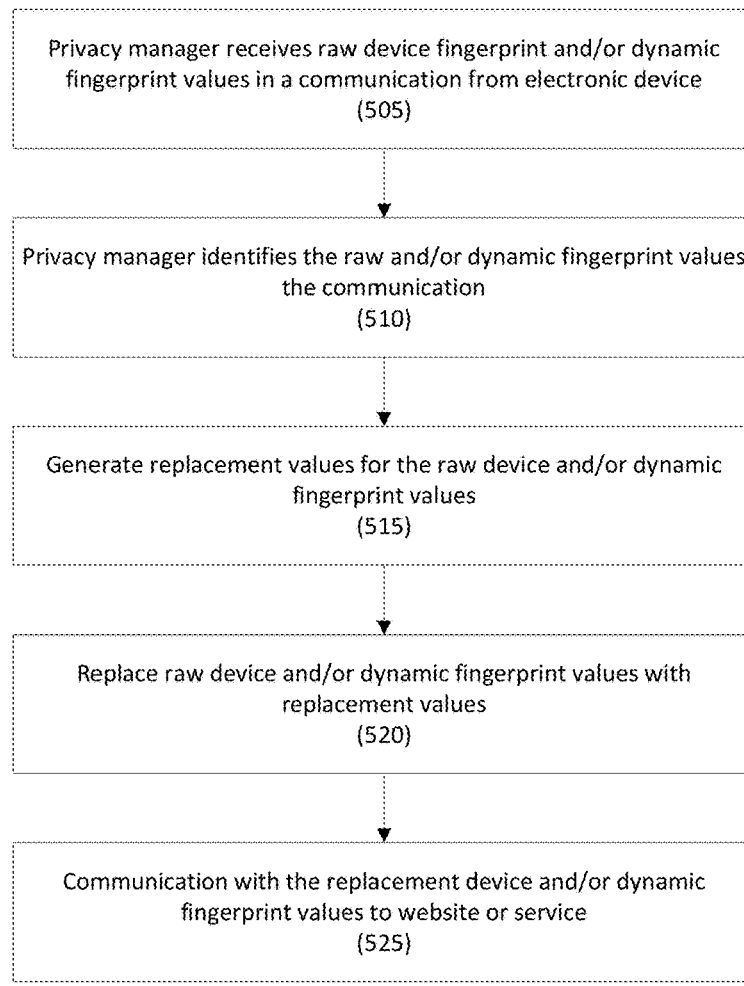
FIG. 5 depicts a method for obfuscation of browser fingerprint data according to one embodiment.

Referring to FIG. 5, a method for obfuscation of browser fingerprint data is disclosed according to one embodiment.

In step 505, a privacy manager program may receive raw device fingerprint values and/or raw dynamic fingerprint values in a communication from an electronic device.

Examples of raw device fingerprint values may include, for example, a browser identifier, a flash status, cookie status, display characteristics, fonts supported, form fields, java status, language status, Silverlight status, operating system type, version, etc., the set time zone, touchscreen status, default browser identification, plugins enabled, the user agent, data stored in persistent browser storage, etc. The following is an exemplary list of device fingerprint values for a browser:

---
Browser: Safari 12.1
Flash: N/A
Cookie: true
Display: 24|1920|1080|1920|1057
Font Smoothing: true
Fonts: Arial|Chalkduster|Courier New|Hiragino Sans GB|Impact|Menlo|Microsoft JhengHei|Microsoft Sans Serif|Plantagenet Cherokee|Rockwell|SimSun|Times New Roman|Verdana|Webdings
Form Fields: url = https://s.codepen.io/run-time/fullpage/XJNXWV
Java: true
Language: lang = en-US|syslang = |userlang=
Silverlight: N/A
OS: Mac OSX (Version Unknown)|Unknown
Time Zone: –7
Touch: false
True Browser: Safari
Plug Ins: webkit built-in pdf
User Agent: mozilla/5.0 (macintosh; intel mac os x 10_14_5) applewebkit/605.1.15 (khtml, like gecko) version/12.1.1 safari/605.1.15|MacIntel|en-US
---

In one embodiment, dynamic fingerprint values, such as the device's GPS coordinates, IP address, etc. may form part of the device fingerprint and may also be replaced, modified, or obscured as is necessary and/or desired.

In step 510, a privacy manager program or a similar program may detect raw device fingerprint values in the communication. For example, the raw device fingerprint values may be in the HTTP header fields sent as part of the GET command, in the HTTP body data sent as part of a POST or PUT command, in the HTTP URL arguments sent as part of the GET command, etc.

In embodiments, one or more techniques may be used to detect the raw device fingerprint values and/or the raw dynamic fingerprint values. For example, techniques such as regular expressions, protocol and argument analysis, inclusion and exclusion filters, general pattern matching algorithms, brute-force searches, etc. may be used as is necessary and/or desired.

In step 515, replacement values for at least some of the raw device fingerprint values and/or the raw dynamic fingerprint values may be generated. For example, for the raw device fingerprint values, this may be done by, for example, changing characters from lowercase to uppercase (e.g., "Touch:false" to "Touch:FALSE"), by inserting or removing white space (e.g., "Browser: Safari" to "Browser:  Safari"), by eliminating redundant values (e.g., "User Agent:mozilla/5.0 (macintosh; intel mac os x 10_14_5) applewebkit/605.1.15 (khtml, like gecko) version/12.1.1 safari/605.1.15|MacIntel|en-US" to "User Agent:mozilla/5.0 (macintosh; intel mac os x 10_14_5) applewebkit/605.1.15 (khtml, like gecko) version/12.1.1 safari/605.1.15|MacIntel|en-US"), by changing version numbers by minor amounts (e.g., "User Agent:mozilla/5.0 (macintosh; intel mac os x 10_14_5) applewebkit/605.1.15 (khtml, like gecko) version/12.1.1 safari/605.1.15|MacIntel|en-US" to "User Agent:mozilla/5.0 (macintosh; intel mac os x 10_14_5) applewebkit/605.1.16 (khtml, like gecko) version/12.1.2 safari/605.1.17|MacIntel|en-US), by inserting unused data elements (e.g., "Plug Ins:webkit built-in pdf" to "Plug Ins:webkit built-in pdf|webkit privacy protection"), combinations thereof, etc. Other techniques may be used as is necessary and/or desired.

In one embodiment, replacement values may be selected so as to not impact, or to minimize the impact, on the user experience. For example, the operating system version value may be replaced with the immediate preceding operating system version, unless this would disrupt the user experience. Similarly, the screen size may be increased or decreased by a few pixels (e.g., 1-3 pixels) as this will not impact the user experience.

In one embodiment, a range for each device fingerprint value and/or dynamic fingerprint value may be provided to eliminate or reduce any impact on the user experience. For example, range of GPS locations, operating system versions, screen sizes, etc. may be provided, and the replacement value may be selected from this range.

In another embodiment, each device fingerprint value and/or dynamic fingerprint value may have a default value to which it may be set. Thus, in embodiment, the device fingerprint value and/or dynamic fingerprint value may always be set to the same value for a plurality of electronic devices.

In one embodiment, the techniques used to generate the replacement values may vary so that at least some of the replacement values differ from one or more prior replacement values that have been used. For example, if the prior replacement value was generated by changing characters from lowercase to uppercase, the next replacement value may be generated by inserting or removing white space(s).

In one embodiment, the device fingerprint value and/or dynamic fingerprint value may be replaced with random values, pseudo-random values, etc.

In one embodiment, multiple replacement values may be generated and tested against a target website or service from test devices. These tests may compare the results returned from the service to results simulated from the real device before selecting which replacement values to use for the actual connection.

In one embodiment, machine learning and/or artificial intelligence may be used to identify which raw device fingerprint values and/or dynamic fingerprint values are not replaced. For example, if the user is using an application that requires the use of the user's physical location (e.g., a rideshare app), the GPS location of the electronic device may not be replaced.

In step 520, the raw device fingerprint values and/or dynamic fingerprint value may be replaced with the replacement values. For example, in one embodiment, the raw device fingerprint values and/or dynamic fingerprint value in the fields or bodies (e.g., HTTP header fields sent as part of the GET command, in the HTTP body data sent as part of a POST or PUT command, in the HTTP URL arguments sent as part of the GET command) may be replaced with the replacement values.

In one embodiment, the same replacement device fingerprint values and/or dynamic fingerprint values may be used in a session, which allows one or more website or service to identify the device. At the conclusion of the session, or at the start of the next session, or as necessary and/or desired, different replacement raw device fingerprint values and/or dynamic fingerprint values may be used. Thus, the device may be tracked within a session, but not across multiple sessions.

In one embodiment, the fingerprint may be locked or associated with a given website, application, or resource, and may be reused with that website, application, or resource if desired. This may provide a uniqueness that may eliminate any issue raised by a random fingerprint. Because the fingerprint may be specific to a website, application, or resource, it would not be shared so that third parties would not be able to develop a device fingerprint.

In step 525, the replacement device fingerprint values and/or dynamic fingerprint values may be communicated to the website and/or service using the same transport connection as the original device.

Although multiple embodiments have been disclosed, it should be recognized that these embodiments are not mutually exclusive and features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for obfuscation of browser fingerprint data, comprising:

providing, on a computer network of a network provider, a privacy manager appliance, wherein the privacy manager appliance comprises an information processing apparatus comprising at least one computer processor;

receiving, at an input interface of the privacy manager appliance, an electronic communication from an electronic device, wherein the electronic communication is addressed to an internet destination;

identifying, by the privacy manager appliance, a raw device fingerprint value in the electronic communication from the electronic device;

selecting, by the privacy manager appliance, a replacement value for the raw device fingerprint value;

replacing, by the privacy manager appliance, the raw device fingerprint value with the replacement value in the electronic communication; and sending, from an output interface of the privacy manager appliance, the electronic communication with the replacement value to the internet destination.

2. The method of claim 1, wherein the privacy manager appliance is provided from a cloud environment.

3. The method of claim 1, wherein the input interface of the privacy manager appliance is configured as a network gateway for the electronic device.

4. The method of claim 1, wherein the electronic communication is from a browser executed by the electronic device.

5. The method of claim 1, wherein the electronic communication is from a computer application executed by the electronic device.

6. The method of claim 1, wherein the internet destination is a website provider or an application provider.

7. The method of claim 1, wherein the raw device fingerprint value comprises one of a browser identifier, a flash status, a cookie status, a display characteristic, a font supported, a form field, a java status, a language status, a Silverlight status, an operating system identifier, an operating system version, a set time zone, a touchscreen status, a default browser identification, an identification of an enabled plugin, and data stored in persistent browser storage.

8. The method of claim 1, wherein the raw device fingerprint value comprises one of GPS coordinates for the electronic device, a geolocation of the electronic device, and an IP address of the electronic device.

9. The method of claim 1, wherein the raw device fingerprint value comprises one of a HTTP header field sent as part of a GET command, HTTP body data sent as part of a POST or PUT command, and a HTTP URL argument sent as part of a GET command.

10. The method of claim 1, wherein the replacement value changes a case of a character in the raw device fingerprint value, inserts or removes a white space in the raw device fingerprint value, eliminates a redundant value in the raw device fingerprint value, changes a version number in the raw device fingerprint value, or inserts an unused data element in the raw device fingerprint value.

11. The method of claim 8, wherein a range of replacement values is provided for each device fingerprint value.

12. The method of claim 1, wherein the replacement value is a default value.

13. The method of claim 1, wherein the replacement value is a random or pseudo-random value.

14. A device for obfuscation of browser fingerprint data, comprising:
at least one computer processor;
a memory;
an input interface; and
an output interface;
wherein:
the device is positioned on a computer network of a network provider;
the input interface is configured to receive an electronic communication from an electronic device, wherein the electronic communication is addressed to an internet destination;
the at least one computer processor is configured to identify a raw device fingerprint value in the electronic communication from the electronic device;
the at least one computer processor is configured to generate a replacement value for the raw device fingerprint value;
the at least one computer processor is configured to replace the raw device fingerprint value with the replacement value in the electronic communication; and
the output interface is configured to send the electronic communication with the replacement value to the internet destination.

15. The device of claim 14, wherein the device is positioned in a cloud environment.

16. The device of claim 14, wherein the input interface is configured as a network gateway for the electronic device.

17. The device of claim 14, wherein the electronic communication is from a browser executed by the electronic device, or from a computer application executed by the electronic device.

18. The device of claim 14, wherein the raw device fingerprint value comprises at least one of a browser identifier, a flash status, a cookie status, a display characteristic, a font supported, a form field, a java status, a language status, a Silverlight status, an operating system identifier, an operating system version, a set time zone, a touchscreen status, a default browser identification, and an identification of an enabled plugin.

19. The device of claim 14, wherein the replacement value changes a case of a character in the raw device fingerprint value, inserts or removes a white space in the raw device fingerprint value, eliminates a redundant value in the raw device fingerprint value, changes a version number in the raw device fingerprint value, or inserts an unused data element in the raw device fingerprint value.

20. A non-transitory computer readable storage medium, including instructions stored thereon for obfuscation of browser fingerprint data, which when read and executed by one or more computers positioned on a computer network of a network provider cause the one or more computers to perform steps comprising:
receiving, at an input interface of the one or more computers, an electronic communication from an electronic device, wherein the electronic communication is addressed to an internet destination;
identifying, by the one or more computers, a raw device fingerprint value in the electronic communication from the electronic device;
selecting, by the one or more computers, a replacement value for the raw device fingerprint value;
replacing, by the one or more computers, the raw device fingerprint value with the replacement value in the electronic communication; and
sending, from an output interface of the one or more computers, the electronic communication with the replacement value to the internet destination.

* * * * *